C. B. NELSON.
TIGHTENER.
APPLICATION FILED MAR. 23, 1912.
1,063,721.
Patented June 3, 1913.
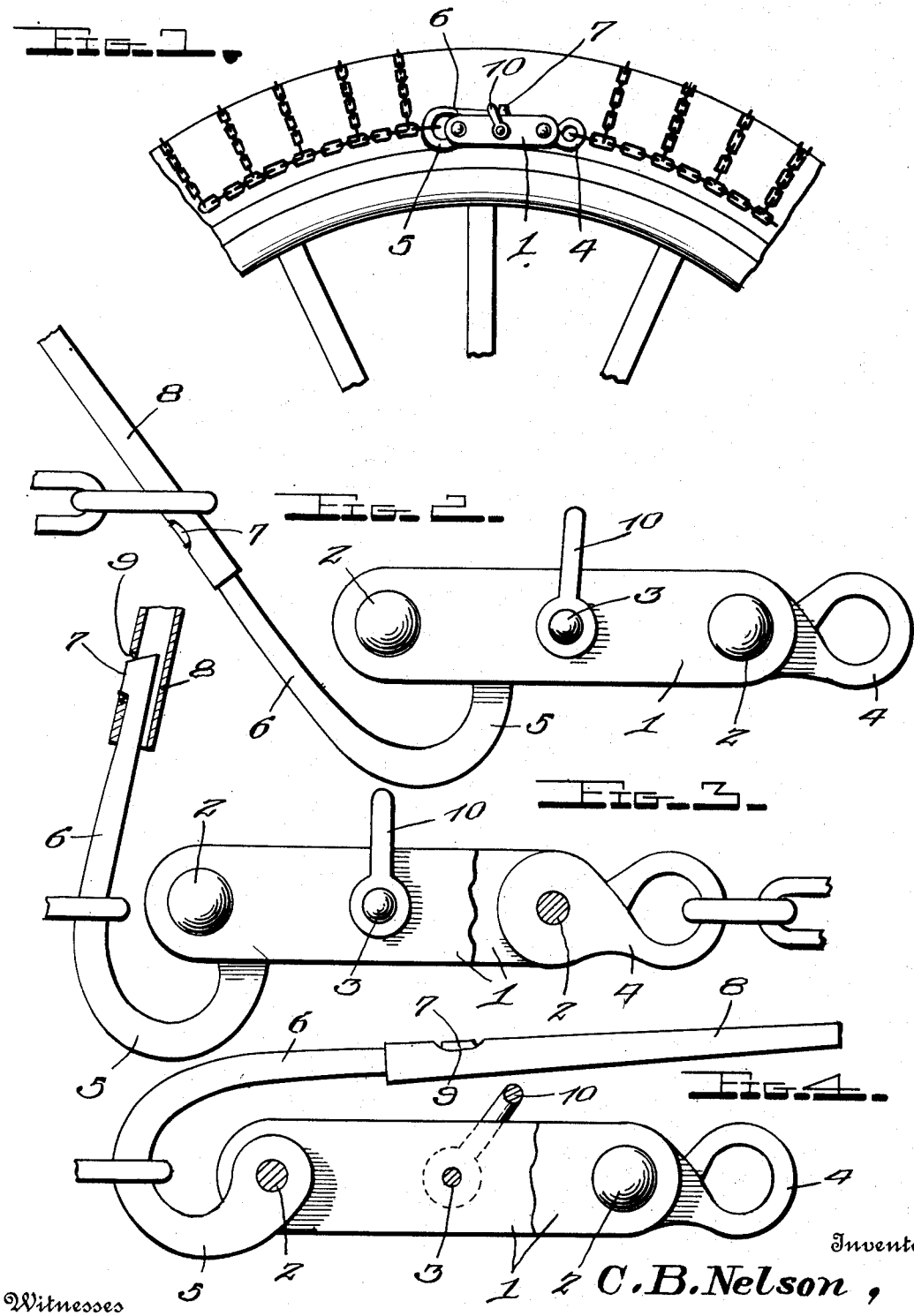
Witnesses
Chas. L. Griesbauer.
A. B. Norton.
Inventor
C. B. Nelson,
By Watson E. Coleman
Attorney

UNITED STATES PATENT OFFICE.

CHARLES B. NELSON, OF LINDSBORG, KANSAS.

TIGHTENER.

1,063,721.

Specification of Letters Patent.

Patented June 3, 1913.

Application filed March 23, 1912. Serial No. 685,792.

*To all whom it may concern:*

Be it known that I, CHARLES B. NELSON, a citizen of the United States, residing at Lindsborg, in the county of McPherson and State of Kansas, have invented certain new and useful Improvements in Tighteners, of which the following is a specification, reference being had to the accompanying drawings.

This invention comprehends certain new and useful improvements in tighteners, and relates particularly to an improved tightener for use in connection with tire chains, although it is to be understood that the invention is not limited in this regard.

The invention has for its primary object a simple, durable and efficient construction of tightener, by the use of which the tire chain may be easily secured in place and held tightly in position around a tire, whereby the wheel will be prevented from slipping around in the chain, as often happens when a chain is loose and the wheel encounters deep mud or heavy snow.

The invention also has for its object an improved construction of tightener of this character, the parts of which may be cheaply manufactured and readily assembled, and which will be strong and not liable to get out of order. And the invention also aims to generally improve devices of this class and to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawing, in which, Figure 1 is a side elevation of a portion of a wheel and a tire shown thereon illustrating the application of my invention. Fig. 2 is an enlarged view of the device detached, illustrating the parts in the initial position they assume in tightening and securing the tire chain in place. Fig. 3 is a similar view partly broken away, illustrating the second position, and, Fig. 4 is a view similar to Fig. 3, illustrating the third position of the parts just preparatory to detaching the handle rod and slipping the bail over the relatively free end of the latch.

Corresponding and like parts are referred to in the following description and designated in the accompanying drawing by like reference characters.

My improved tightener includes a pair of plates or bars 1 mounted in laterally spaced relation to each other and secured together in the present embodiment of the invention by end rivets 2 and an intermediate rivet 3. Pivotally mounted on one of the end rivets 2 between the plates 1, is a link 4 designed for engagement with one end of a tire chain, as clearly illustrated in Fig. 1, and on the other end rivet 2, a curved latch 5 is pivotally mounted, said latch being returned upon itself to form a preferably tapered shank 6 which is formed at its extremity with a laterally extending lug 7. The link at the other end of the tire chain is designed to be slipped over this shank 6 of the latch 5 and be finally lodged in the bent or crook of the latch, as clearly illustrated in the drawing.

In connection with the latch 5, I preferably employ a hand rod 8 which is tubular at one end, as best illustrated in Fig. 3, and is designed to be slipped over the shank 6 of the latch 5, said hand rod being formed with a slot 9 adapted to accommodate the lug 7, whereby to securely and yet detachably connect the hand rod to the latch.

Upon the intermediate rivet 3 of the side plates or bars 1, a bail 10 is pivotally mounted, said bail extending over the outer sides of the plates 1, as shown. This bail is adapted to be swung over the end of the shank 6 after the latch has been moved to relatively closed position.

From the foregoing description in connection with the accompanying drawing, the operation of my improved tightener will be apparent.

In the practical use of the device, the hand rod 8 is mounted upon the shank 6, and one of the links of the tire chain is slipped over the rod, preferably to the initial position illustrated in Fig. 2. The rod is then swung inwardly and the said link slipped downwardly, as illustrated in Fig. 3, until the link slips into the crook or bend of the latch, as illustrated in Fig. 4, whereupon the chain will be held taut and under proper tension. In order to lock the parts in this position and prevent the accidental opening of the tightener, the bail can be swung over the shank 6 of the latch, as illustrated in Fig. 1.

While the accompanying drawing illustrates what I believe to be the preferred embodiment of my invention, it is to be understood that the invention is not limited thereto, but that various changes may be made in the construction, arrangement and proportions of the parts without departing from the scope of the invention, as defined in the appended claim.

What I claim is:—

A tightener of the character described embodying laterally spaced plates, end rivets and an intermediate rivet connecting said plates together, a link and a curved latch pivotally mounted on the opposite end rivets, said link and latch being mounted between the plates, thereby spacing them, said latch having a free end formed at its extremity with a lug, said intermediate rivet extending beyond the opposite sides of the tightener, and a substantially U-shaped bail, the opposite ends of said bail extending over the outer sides of said plates and engaging the opposite ends of the intermediate rivet, the free end of the latch being of a length to occupy a position in proximity to the bail, whereby the extremity of said latch and its lug may be engaged with the intermediate portion of said bail between the plates.

In testimony whereof I hereunto affix my signature in the presence of two witnesses.

CHARLES B. NELSON.

Witnesses:
C. A. PETERSON,
G. EDWIN JOHNSON.